(12) United States Patent
Nookala et al.

(10) Patent No.: US 8,660,527 B2
(45) Date of Patent: Feb. 25, 2014

(54) CONTROL OF DATA CALL ORIGINATION BASED ON PRIOR ORIGINATION ATTEMPTS

(75) Inventors: Sriram Nagesh Nookala, San Diego, CA (US); Rotem Cooper, San Diego, CA (US); James A. Hutchison, San Diego, CA (US); Venugopal Ramamurthy (Gopal), San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 11/239,711

(22) Filed: Sep. 29, 2005

(65) Prior Publication Data

US 2006/0183472 A1 Aug. 17, 2006

Related U.S. Application Data

(60) Provisional application No. 60/654,771, filed on Feb. 17, 2005.

(51) Int. Cl.
*H04M 1/66* (2006.01)
(52) U.S. Cl.
USPC ..... 455/410; 455/435.1; 455/445; 455/552.1; 455/405; 379/221.03; 379/221.05; 370/352; 370/356
(58) Field of Classification Search
USPC .......... 455/405, 433, 453, 410–411, 455/432.1–452.2, 552.1; 370/230.1, 231, 2, 370/437, 328–338, 352–356
See application file for complete search history.

(56) References Cited

U.S. PATENT DOCUMENTS

| 5,280,630 | A | * | 1/1994 | Wang | 455/452.2 |
| 5,640,445 | A | * | 6/1997 | David | 379/112.01 |
| 5,896,448 | A | * | 4/1999 | Holt | 379/221.03 |
| 5,960,338 | A | * | 9/1999 | Foti | 455/405 |

(Continued)

FOREIGN PATENT DOCUMENTS

| EP | 0874508 A | * | 4/1997 |
| EP | 0874508 A1 | | 4/1997 |

(Continued)

OTHER PUBLICATIONS

International Search Report—PCT/US06/005786—International Search Authority, European Patent Office—Jun. 29, 2006.

(Continued)

*Primary Examiner* — Sharad Rampuria
(74) *Attorney, Agent, or Firm* — Kristine U. Ekwueme

(57) ABSTRACT

A wireless device receives a request to originate a data call, e.g., from the user or a higher layer application. If origination control is not to be applied, then the wireless device originates the data call immediately. Otherwise, the origination of the data call is controlled based on prior data call origination attempts that are applicable to the data call. For example, the wireless device may originate the data call immediately if (1) the most recent origination attempt was successful or (2) the most recent origination attempt was unsuccessful but a predetermined time period has elapsed since this unsuccessful origination attempt. If the most recent origination attempt was unsuccessful and the predetermined time period has not elapsed, then the wireless device may (1) wait until this predetermined time period elapses and then originate the data call or (2) reject the data call.

39 Claims, 8 Drawing Sheets

(56) References Cited

U.S. PATENT DOCUMENTS

| | | | |
|---|---|---|---|
| 6,011,978 A * | 1/2000 | Ault et al. | 455/552.1 |
| 6,085,084 A * | 7/2000 | Christmas | 455/411 |
| 6,311,055 B1 * | 10/2001 | Boltz | 455/414.1 |
| 6,377,677 B1 * | 4/2002 | Ackerley et al. | 379/279 |
| 6,952,411 B2 * | 10/2005 | Sinnarajah et al. | 370/335 |
| 7,433,335 B2 * | 10/2008 | Bi et al. | 370/329 |
| 7,664,497 B2 * | 2/2010 | Willey et al. | 455/435.1 |
| 8,045,515 B2 * | 10/2011 | Nookala et al. | 370/329 |
| 8,417,285 B2 * | 4/2013 | Bonner | 455/552.1 |
| 2002/0193110 A1 | 12/2002 | Julka et al. | |
| 2003/0210649 A1 | 11/2003 | Bondi | |
| 2004/0243661 A1 | 12/2004 | Ahn et al. | |
| 2006/0141991 A1 * | 6/2006 | House et al. | 455/412.1 |

FOREIGN PATENT DOCUMENTS

| | | | |
|---|---|---|---|
| EP | 0874508 A1 * | 4/1997 | |
| EP | 0884508 A1 * | 4/1997 | |
| EP | 0874508 * | 10/1998 | |
| EP | 0874508 A1 * | 10/1998 | |
| JP | 10262143 A | 9/1998 | |
| JP | 2001119452 | 4/2001 | |
| JP | 2001268616 A | 9/2001 | |
| JP | 2001313777 A | 11/2001 | |
| JP | 2002152838 | 5/2002 | |
| JP | 2002232554 A | 8/2002 | |
| JP | 2003134194 | 5/2003 | |
| JP | 2004537181 A | 12/2004 | |
| WO | 0245386 A2 | 6/2002 | |

OTHER PUBLICATIONS

Written Opinion—PCT/US06/005786—International Search Authority, European Patent Office—Jun. 29, 2006.

International Preliminary Report on Patentability—PCT/US06/005786—The International Bureau of WIPO, Geneva, Switzerland—Aug. 21, 2007.

European Search Report—EP10179619, Search Authority—Munich Patent Office, Oct. 27, 2010.

Taiwan Search Report—TW095105532—TIPO—Aug. 29, 2012.

* cited by examiner

| Network Type | Network Zone | Data Call Type | Call Failure Type | Throttle Enable | Current Timer Value | Time of Last Origination Attempt |
|---|---|---|---|---|---|---|
| 1xEV-DO | Subnet-ID a | Packet Data | PPP | Yes | $W_a$ | $T_a$ |
| 1xEV-DO | Subnet-ID b | Packet Data | PPP | No | $W_b$ | $T_b$ |
| cdma2000 | SID/NID/PZID c | SO-33 | Radio Network | Yes | $W_c$ | $T_c$ |
| cdma2000 | SID/NID/PZID d | SO-15 | PPP | Yes | $W_d$ | $T_d$ |
| cdma2000 | SID/NID/PZID d | SO-25 | Mobile IP | Yes | $W_e$ | $T_e$ |
| ... | ... | ... | ... | ... | ... | ... |

400

CONTROL OF DATA CALL ORIGINATION BASED ON PRIOR ORIGINATION ATTEMPTS

The present Application for Patent claims priority to Provisional Application No. 60/654,771 entitled "Throttling of the Data call originations based on Failure reasons" filed Feb. 17, 2005, and assigned to the assignee hereof and hereby expressly incorporated by reference herein.

BACKGROUND

I. Field

The present disclosure relates generally to communication, and more specifically to techniques for originating data calls in a wireless communication network.

II. Background

Wireless communication networks are widely deployed to provide various communication services such as voice, data, video, broadcast, messaging, and so on. These networks may be multiple-access networks capable of supporting communication with multiple users by sharing the available system resources. Examples of such multiple-access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks. A CDMA network may implement a radio access technology (RAT) such as cdma2000, Wideband-CDMA (W-CDMA), and so on. cdma2000 covers IS-2000 and IS-95 standards. A TDMA network may implement a RAT such as Global System for Mobile Communications (GSM). These various RATs and standards are known in the art.

A wireless device may originate a data call in order to obtain data service from a wireless network. The process to originate a data call is referred to as data call origination. The wireless device performs a sequence of tasks with one or more network entities for data call origination. The data call may succeed or fail for various reasons. If the data call fails, then the wireless device may originate the data call once more. Depending on the outcome of each origination attempt, the wireless device may repeat the data call origination any number of times, possibly automatically without regards to the causes of the call failures. Each failed origination attempt consumes valuable radio-link resources without achieving any useful result or benefit.

There is therefore a need in the art for techniques to control data call origination in a manner to conserve radio-link resources.

SUMMARY

Techniques for controlling origination of data calls based on a history of prior data call origination attempts (or a call history) are described herein. A wireless device may maintain the call history in a call history table. Each entry in the table may be for a different combination of wireless network, network zone, and data call type, as described below. Each entry may contain information such as whether the last data call origination attempt was successful or unsuccessful, the number of failed origination attempts since the last successful origination attempt, and so on. The wireless device may use the call history to control subsequent data call originations so that radio-link resources are conserved.

In an embodiment of the techniques, a request to originate a data call is received (e.g., from the user or a higher layer application), and a determination is made whether to control origination of the data call. Origination control may be applied to certain types of data calls and not applied to other types of data calls. If origination control is not to be applied, then the wireless device originates the data call immediately. Otherwise, the origination of the data call is controlled based on prior data call origination attempts that are applicable to this data call. For example, the wireless device may originate the data call immediately if (1) the most recent origination attempt was successful or (2) the most recent origination attempt was unsuccessful but a predetermined time period has elapsed since this unsuccessful origination attempt. If the most recent origination attempt was unsuccessful and the predetermined time period has not elapsed, then the wireless device may (1) wait until this predetermined time period elapsed and then originate the data call or (2) reject the data call. The predetermined time period may be a fixed duration or a variable duration. The variable duration may be dependent on various factors such as the number of unsuccessful origination attempts since the last successful origination attempt (e.g., a longer duration for more failed origination attempts), the type of failure encountered for the most recent origination attempt, and so on. If the data call is originated, then the call history is updated based on the outcome for this origination attempt.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for controlling origination of data calls may be used for various wireless communication networks and systems. For example, these techniques may be used for a cdma2000 network, a 1xEV-DO network, a Universal Mobile Telecommunications System (UMTS) network, a GSM network, a GSM/EDGE network that implements GSM and General Packet Radio Service (GPRS), a wireless local area network (WLAN) such as an IEEE 802.11 network, and so on. For clarity, much of the description below is for cdma2000 and 1xEV-DO networks. A cdma2000 network implements IS-2000 and/or IS-95 and can provide voice and data services. A 1xEV-DO network implements IS-856 and is optimized for data service.

Figure 1:
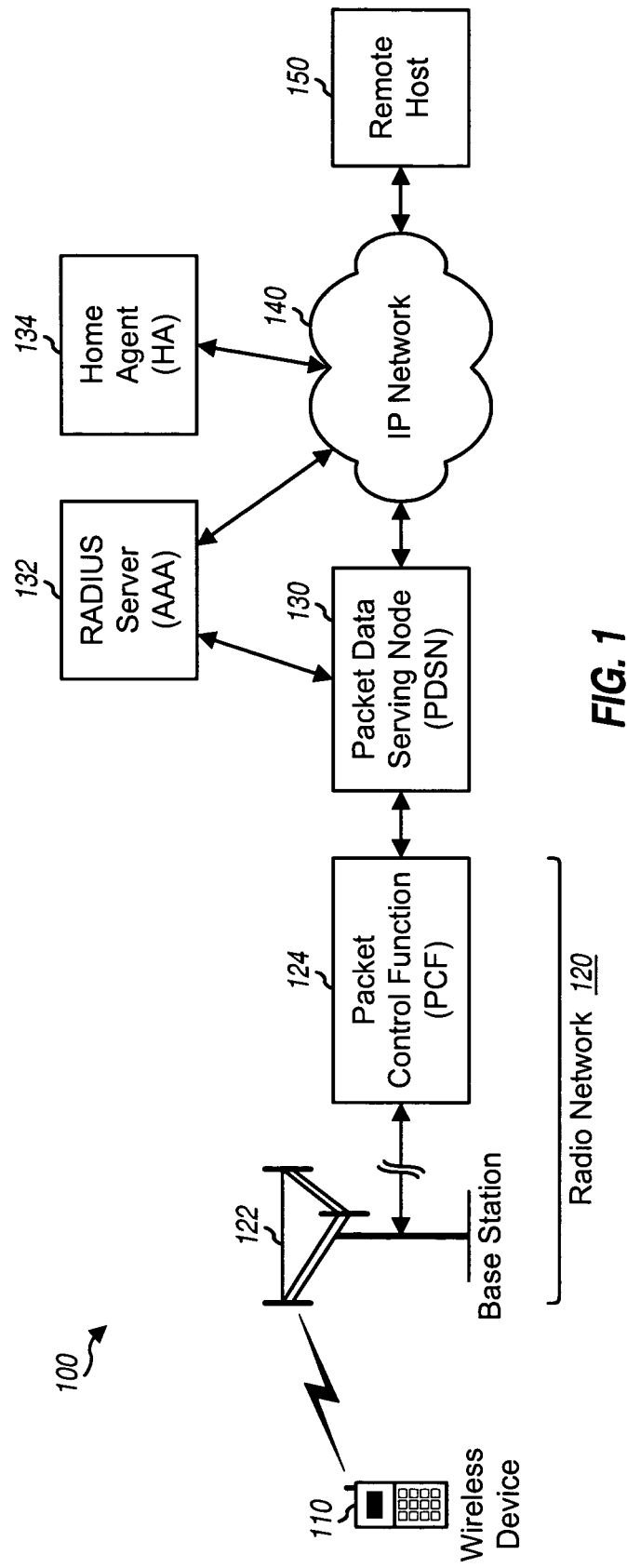
FIG. 1 shows a wireless device communicating with a wireless network.

FIG. 1 shows a wireless device 110 communicating with a wireless communication network 100, which is also called an access provider network. Wireless network 100 may be a cdma2000 network or a 1xEV-DO network. Wireless network 100 includes a base station 122, a packet control function (PCF) 124, a packet data serving node (PDSN) 130, a remote authentication dial-in user service (RADIUS) server 132, and a home agent (HA) 134. Base station 122 provides radio communication for wireless devices and may also be called an access point (1xEV-DO terminology), a base transceiver station (BTS), or some other terminology. Packet control function 124 controls the transmission of data packets between base station 122 and PDSN 130. PDSN 130 supports data services for the wireless devices in wireless network 100. RADIUS server 132 provides authentication, authorization, and accounting (AAA) functions. Home agent 134 supports Mobile Internet Protocol (IP) and is responsible for routing data to mobile wireless devices currently attached to a foreign network. PDSN 130, RADIUS server 132, and home agent 134 may communicate via direct connections or via IP network 140. IP network 140 may include the public Internet and/or private IP networks. Other entities such as a remote host 150 may also couple to IP network 140.

Wireless network 100 is composed of a radio network 120 and a packet data network. Radio network 120 includes base station 122 and packet control function 124 and supports radio communication. The packet data network includes PDSN 130 and supports packet-switched communication between radio network 120 and IP network 140. Wireless network 100 typically includes other network entities that are not shown in FIG. 1 for simplicity. The network entities shown in FIG. 1 may also be referred to by other terminology. For example, in a UMTS network, base station 122 is called a Node B, packet control function 124 is called a serving GPRS support node (SGSN), and PDSN 130 is called a gateway GPRS support node (GGSN).

Wireless device 110 may be fixed or mobile and is also called a mobile station (cdma2000 terminology), an access terminal (1xEV-DO terminology), a user equipment (UMTS terminology), a terminal, a subscriber unit, or some other terminology. Wireless device 110 may be able to communicate with a cdma2000 network, or a 1xEV-DO network, or both networks.

Wireless network 100 may support Simple IP and/or Mobile IP. Simple IP refers to a service in which a wireless device is assigned an IP address and is provided IP routing service by the wireless network. The wireless device retains its IP address as long as it is served by a radio network that has connectivity to the same serving PDSN. Mobile IP refers to a service in which a wireless device is able to maintain a persistent IP address even when handed off between radio networks connected to different PDSNs. Data call origination is different for Simple IP and Mobile IP.

Figure 2A:
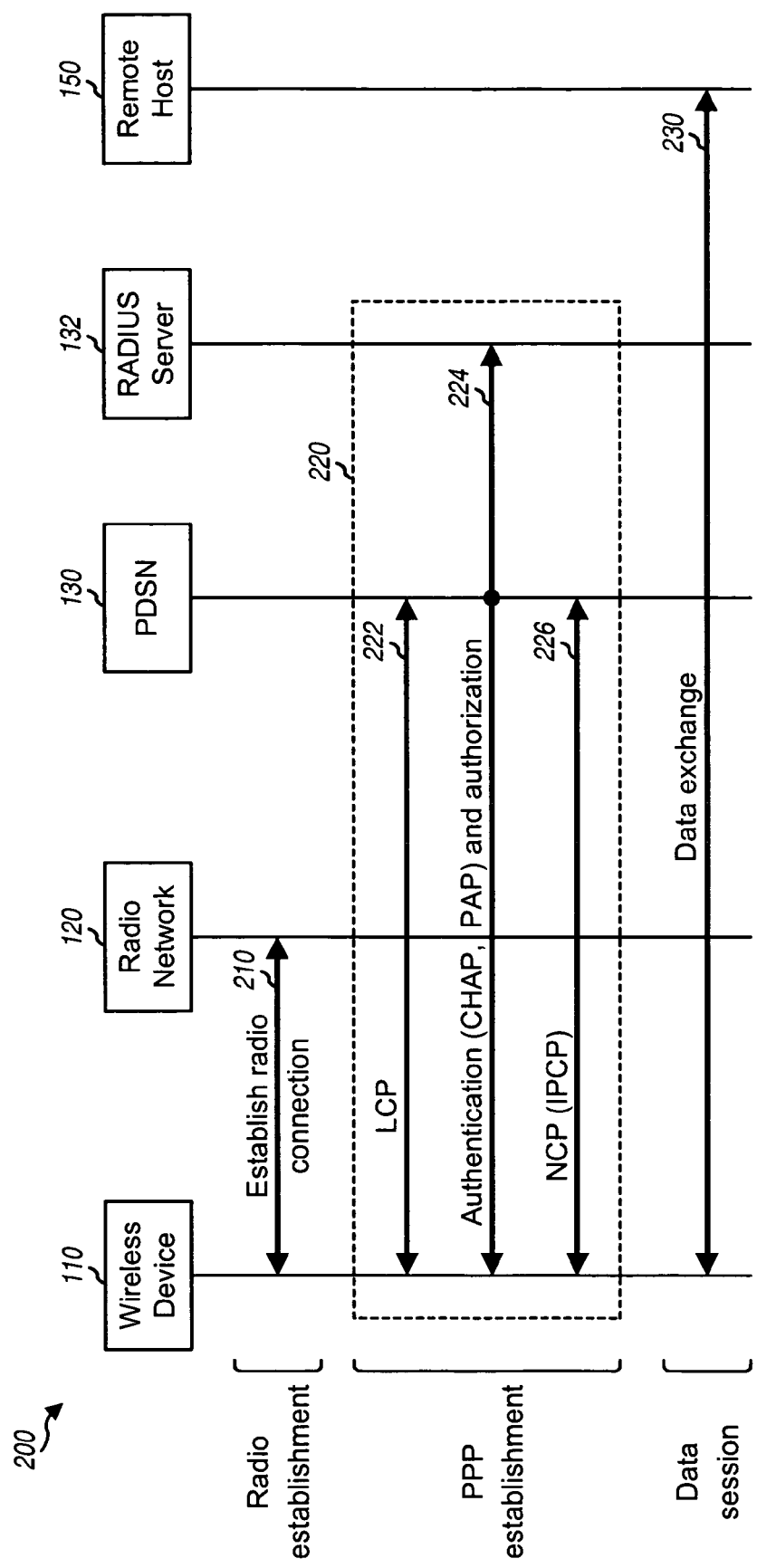
FIG. 2A shows data call origination by the wireless device for Simple IP.

FIG. 2A shows a call flow 200 for data call origination by wireless device 110 for Simple IP. The data call origination may be initiated by a user at wireless device 110 or an application running on the wireless device. Wireless device 110 initially establishes radio connection with radio network 120 and brings up a traffic channel, which is used to send data to the radio network (step 210). Wireless device 110 then establishes a PPP (Point-to-Point Protocol) session with PDSN 130 (block 220). To establish the PPP session, wireless device 110 and PDSN 130 exchange LCP (Link Control Protocol) packets to configure and test the data link (step 222). After the data link has been established, wireless device 110 may be authenticated using CHAP (Challenge Handshake Authentication Protocol) or PAP (Password Authorization Protocol) (step 224). Authorization may also be performed to ensure that wireless device 110 can receive the requested data service (also step 224). Wireless device 110 and PDSN 130 then exchange NCP (Network Control Protocol) packets or IPCP (Internet Protocol Control Protocol) packets to select and configure one or more network layer protocols, such as IP, which operate on top of PPP (step 226). Wireless device 110 can then exchange data with remote host 150 via PDSN 130 (step 230).

Figure 2B:
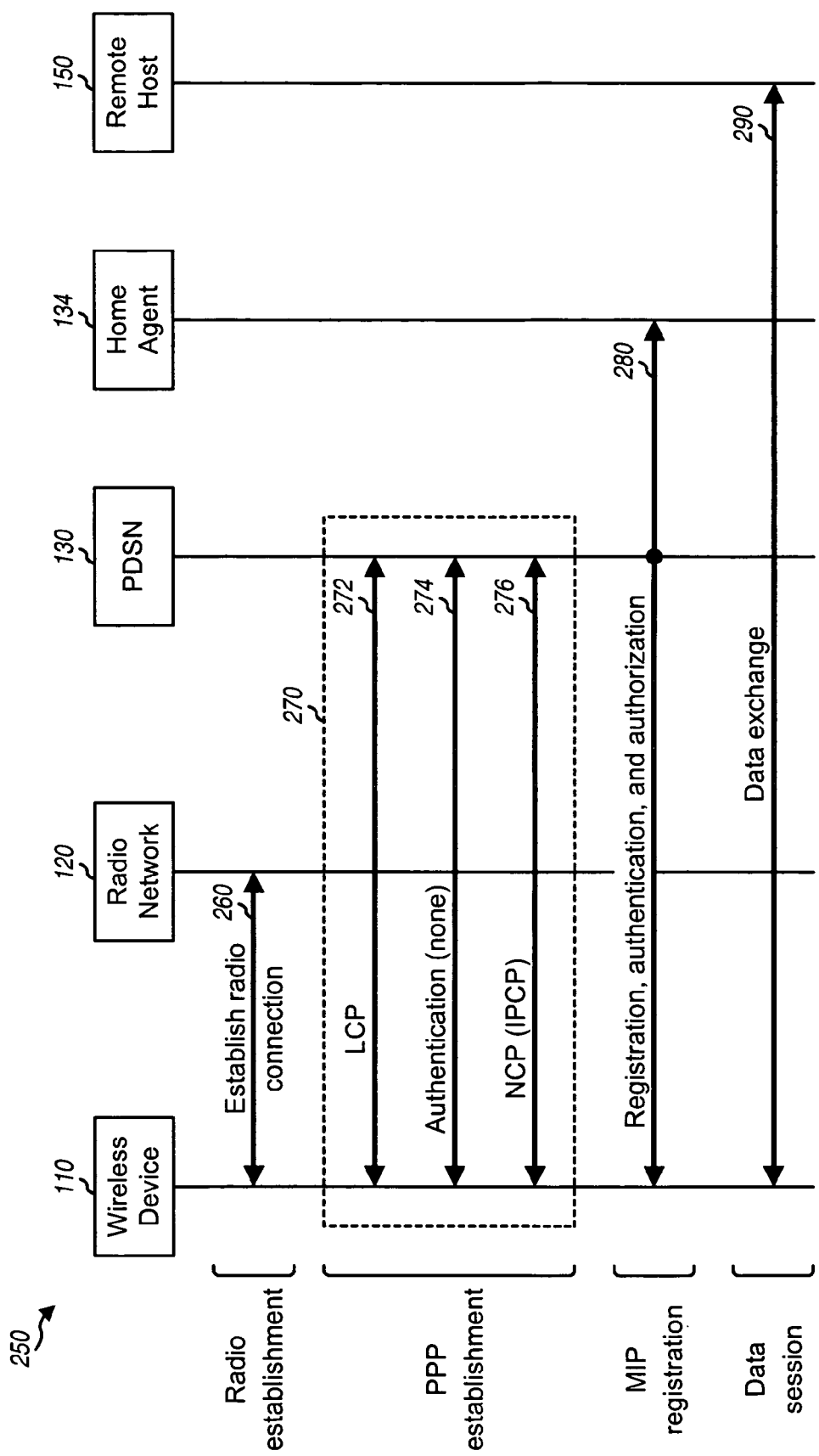
FIG. 2B shows data call origination by the wireless device for Mobile IP.

FIG. 2B shows a call flow 250 for data call origination by wireless device 110 for Mobile IP. Wireless device 110 initially establishes radio connection with radio network 120 and brings up a traffic channel (step 260). Wireless device 110 then establishes a PPP session with PDSN 130 (block 270). To establish the PPP session, wireless device 110 and PDSN 130 exchange LCP packets to configure and test the data link (step 272). After the data link has been established, wireless device 110 should not use CHAP or PAP and should request no PPP authentication (step 274). Wireless device 110 and PDSN 130 then exchange NCP or IPCP packets to select and configure one or more network layer protocols (step 276). Wireless device 110 then performs Mobile IP (MIP) registration, which entails registering with home agent 134, authenticating the wireless device, and authorizing the wireless device for the requested data service (step 280). Wireless device 110 can then exchange data with remote host 150 via PDSN 130 (step 290).

Data call originations for both Simple IP and Mobile IP in cdma2000 are described in 3GPP2 X.S0011-002-C, entitled "cdma2000 Wireless IP Network Standard: Simple IP and Mobile IP Access Services," August 2003. PPP establishment is described in RFC 1661, entitled "The Point-to-Point Protocol (PPP)," July 1994. Mobile IP registration is described in RFC 2002, entitled "IP Mobility Support," October 1996. These documents are publicly available.

Wireless device 110 may be in a Null state, a dormant state, or an active state at any given moment. In the Null state, PPP is not established and a traffic channel has not been assigned. In the dormant state, PPP is established but a traffic channel has not been assigned. In the active state, PPP is established, a traffic channel has been assigned, and the wireless device can exchange data with the wireless network. The wireless device can originate a data call in the Null state and can re-originate a data call in the dormant state.

FIGS. 2A and 2B show cases in which data call originations are successful. In many instances, data call originations may not succeed due to various reasons. For example, data call origination may fail for any of the following reasons:
The wireless device is not a valid data subscriber;
Authentication fails at PPP or MIP registration;
The network is temporarily unavailable; and
Other reasons.

A scenario for invalid data subscriber may be as follows. The wireless device originates a data call. The base station communicates with the PDSN and typically also communicates with the RADIUS server (for Simple IP) or the home agent (for Mobile IP). The RADIUS server or the home agent determines whether the wireless device has subscribed for the requested data service and, if not, informs the base station that the wireless device is not a valid data subscriber. The base station then rejects the data call origination with a reason.

Some scenarios for authentication failure may be as follows. The wireless device originates a data call from the Null state. The base station assigns a traffic channel to the wireless device. PPP is then negotiated between the wireless device and the PDSN. For Simple IP, authentication (e.g., CHAP or PAP) during PPP negotiation may fail. For Mobile IP, authentication during MIP registration may fail.

Some scenarios for network unavailability may be as follows. In one scenario, the wireless device originates a data call from the Null state. The data call may fail if the radio network is not able to establish the A10/A11 connections between the packet control function and the PDSN and hence rejects the data call. The data call may also fail if the radio network successfully establishes the A10/A11 connections but the PPP negotiation fails due to the PDSN being in a bad state. In another scenario, the wireless device re-originates a data call from the dormant state. The data call may fail if the radio network could not communicate with the PDSN and hence rejects the data call. The data call may also fail if the radio network accepts the data call but the PDSN is in a bad state and discards the data call.

Data call originations for Simple IP and Mobile IP may also fail due to PPP negotiation failures resulting from an LCP timeout, an IPCP timeout, PPP setup failure, and so on. An LCP timeout occurs if a response for an LCP Configure-Request packet is not received within an LCP timeout period. An IPCP timeout occurs if IPCP negotiation is unsuccessful after an IPCP timeout period. PPP setup may fail due to mismatch in options at the wireless device and the PDSN for initial data call setup or for PPP resynchronization following a handoff. For Simple IP, PPP negotiation failure may also result from PPP authentication failure.

Data call origination for Mobile IP (MIP) may also fail for the following reasons: a MIP agent solicitation timeout, a MIP RRQ (Registration Request) timeout, MIP foreign agent failure, and MIP home agent failure. A MIP agent solicitation timeout occurs if a response for an Agent Solicitation message is not received within a timeout period. A MIP RRQ timeout occurs if a reply for a Registration Request is not received within an RRQ timeout period. MIP foreign agent failure occurs if a Registration Reply message with a foreign agent failure code is received from the home agent. MIP home agent failure occurs if a Registration Reply message with a home agent failure code is received from the PDSN.

The wireless device may maintain a history of prior data call origination attempts, e.g., in a call history table. Each entry in the call history table may be for a different combination of wireless network, network zone, and data call type, as described below. Each entry may include information such as whether the last data call origination attempt was successful or unsuccessful, the number of failed data call origination attempts (or call failures) since the last successful origination attempt, and so on. The call history may be maintained for certain types of call failures that are indicative of the likelihood of success for future data call originations. The wireless device may use this call history to control subsequent data call originations so that radio-link resources are conserved. The use of prior origination attempts to control future data call originations is referred to as "call throttling".

In an embodiment, the following types of call failures result in throttling of future data call originations:
  Rejection of data call origination by the radio network—this may be due to the wireless device not being a valid data subscriber, the radio network not being able to communicate with the PDSN, and so on;
  Authentication failure—this may occur during PPP negotiation (for Simple IP) or MIP registration (for Mobile IP);
  PPP negotiation failure—this may be due to the PDSN being in a bad state, an LCP timeout, an IPCP timeout, PPP setup failure, and so on; and
  Mobile IP setup failure—this may be due to a MIP agent solicitation timeout, a MIP RRQ timeout, MIP foreign agent failure, MIP home agent failure, and so on.

PPP negotiation is not performed if the wireless device re-originates a data call from dormancy. The PDSN may be in a bad state and may discard the data from the wireless device. The wireless device would not know that data is not passing through. Thus, if the wireless device re-originates a data call from dormancy and the radio network accepts the data call but data it not properly exchanged, then the wireless device may rely on applications running at higher layer to throttle future data calls.

In an embodiment, call throttling is achieved based on a back-off timer that indicates the amount of time to wait after a call failure before originating the data call again. The timer may be set to an increasingly larger value after each call failure and may be reset if the data call is successful. The timer may be set to $W_1$ minutes after the first call failure, $W_2$ minutes after the second call failure, $W_3$ minutes after the third call failure, and $W_4$ minutes after the fourth call failure, where in general $W_1 < W_2 < W_3 < W_4$. For example, a set of four exponential values, $W_1=1$, $W_2=2$, $W_3=4$, and $W_4=8$ minutes, may be used for the timer. Other sets of timer values, which may include any number of timer values and any given timer value, may also be used for the timer. The set of timer values selected for use is denoted as W. The wireless device does not originate a data call if the timer is running.

Figures 3, 4:
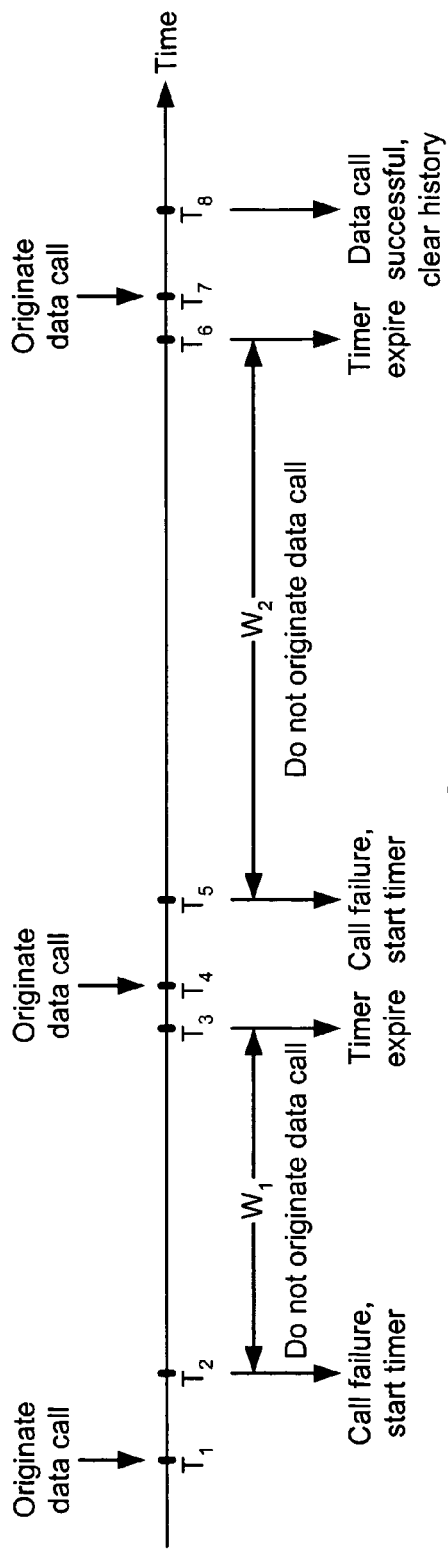
FIG. 3 illustrates data call origination with call throttling.
FIG. 4 shows an exemplary call history table.

FIG. 3 illustrates data call origination with call throttling. At time $T_1$, the wireless device originates a data call. At time $T_2$, the wireless device encounters call failure, sets the timer to $W_1$ minutes, and starts the timer. The wireless device does not originate a data call until the timer expires. At time $T_3$, which is $W_1$ minutes after time $T_2$, the timer expires. At time $T_4$, which is after time $T_3$, the wireless device originates the data call again. At time $T_5$, the wireless device encounters call failure, sets the timer to $W_2$ minutes, and starts the timer. At time $T_6$, which is $W_2$ minutes after time $T_5$, the timer expires. At time $T_7$, which is after time $T_6$, the wireless device originates the data call again. At time $T_8$, the wireless device determines that the data call is successful and clears the call history so that the timer will be set to $W_1$ minutes (instead of $W_3$ minutes) if and when the next call failure is encountered.

In order to avoid overloading the wireless network due to many wireless devices backing off and originating data calls at the same time, different time offsets may be used for the timers for different wireless devices. For example, a random offset may be generated for each wireless device based on a mobile device number (MDN), which is a phone number for the wireless device. The timer for the wireless device would then be offset from system time by this random offset.

The call history may include various types of information and may be maintained in various formats. In an embodiment, the call history is maintained separately for each network zone in each wireless network. For cdma2000, each larger system is identified by a system identification (SID) value, each smaller network within a given system is identified by a network identification (NID) value, and each PCF coverage area within a given SID/NID area is identified by a packet zone identification (PZID) value. Each network zone in the cdma2000 network may thus be identified by a SID/NID/PZID triplet. For 1xEV-DO, the systems and smaller networks are identified using a subnet-ID, which may be up to 128 bits long and follow IPv6 representation format described in RFC2460, entitled "Internet Protocol, Version 6 (IPv6) Specification," December 1998. Each network zone in the 1xEV-DO network may thus be identified by a subnet-ID. Similar network identifiers may be used for other wireless networks such as GSM, GSM/GPRS, UMTS, and 802.11 networks. The reason for keeping the call history separately for each network zone is because call failures in one network zone may not be indicative of the likelihood of success for data call originations in other network zones.

In an embodiment, the call history is maintained separately for each data call type of interest. For cdma2000, the call history may be maintained for the following data call types: (1) service option 33 (SO-33) for high speed packet data service, (2) service option 12 (SO-12) for low data rate circuit-switched packet data service, (3) service option 15 (SO-15) for medium data rate packet data service in IS-95A, and (4) service option 25 (SO-25) for medium data rate packet data service in IS-95B. Alternatively, all of the service options in cdma2000 may be considered as belonging to one data call type, and the call history may be maintained for this one data call type. For 1xEV-DO, the call history may be maintained for one data call type, which is packet data. In general, the call history may be maintained for any number of data call types and any given data call type. The reason for keeping the call history separately for each data call type is because call failures for one data call type may not be correlated with the likelihood of success for data call originations for other data call types.

The call history may keep track of only certain types of call failures for which call throttling applies. The call history may also keep track of the type of failure encountered for a failed data call. For example, the call history may keep track of whether a call failure was due to radio network rejection, authentication failure, PPP negotiation failure, Mobile IP setup failure, and so on. The same or different sets of timer values may be used for different call failure types. For example, a first set of smaller timer values may be used for call failures due to radio network rejection, a second set of larger timer values may be used for PPP negotiation failures, and a third set of even larger timer values may be used for Mobile IP setup failures. In general, the timer values may be matched to the expected amount of time in which the causes of the call failures will be remedied. The timer values may be determined based on field measurements, computer simulation, or by some other means. In an embodiment, the call history keeps track of whether call failures are due to radio network, PDSN, or Mobile IP. In another embodiment, all call failures are treated as being of the same type, and the call history does not keep track of the failure type for each call failure. In general, the call history may keep track of any number of call failure types and any given call failure type.

FIG. 4 shows an exemplary call history table 400. For the embodiment shown in FIG. 4, table 400 includes seven columns for network type, network zone, data call type, call failure type, throttle enable, current timer value, and time of last origination attempt. The network type may be set to cdma2000 or 1xEV-DO. The network zone may be set to a SID/NID/PZID triplet for cdma2000 or to a subnet-ID for 1xEV-DO. The data call type may be set to SO-33, SO-12, SO-15, or SO-25 for cdma2000 or to packet data for 1xEV-DO. The failure type may be set to "radio network" for radio network related failures, "PPP" for PPP related failures, or "Mobile IP" for Mobile IP related failures.

For the embodiment shown in FIG. 4, one entry may be generated in table 400 for each different combination of network type, network zone, and data call type. For each entry, the throttle enable may be set to either (1) 'Yes' to indicate that throttling is to be performed for origination of data calls covered by that entry (e.g., data calls of the same data call type, network zone, and wireless network as the entry) or (2) 'No' to indicate that throttling is not to be performed. Alternatively, a timer value of zero ($W_0=0$) may be used to indicate that throttling is not to be performed.

Entries in table 400 may be generated and deleted in various manners. In an embodiment, the table initially contains no entries. Whenever a call failure occurs, the call failure type, data call type, network zone, and wireless network for the call failure are ascertained. If an entry does not already exist in the table for this combination of data call type, network zone, and wireless network, then a new entry is generated in the table for this call failure. If an entry already exists in the table for this combination, then this entry is updated with this call failure. Whenever a call success is encountered, the data call type, network zone, and wireless network for the data call are ascertained. The entry in the table for this combination of data call type, network zone, and wireless network is identified and updated with this call success. For the above embodiment, entries are generated as call failures occur and may be deleted as call successes are encountered. In another embodiment, entries are generated for all or many of the possible combinations of data call type, network zone, and wireless network and are updated based on call failures and successes.

In an embodiment, table 400 stores the following information for each entry: (1) the status (e.g., success or failure) of the most recent data call origination attempt for that entry and (2) the number of failed origination attempts since the last successful origination attempt for that entry. These two pieces of information may be conveniently expressed by a timer value used for the back-off timer for the most recent call failure (if any) for that entry. The timer value for an entry may be initialized to zero and may also be reset to zero if call success is encountered for the entry. The timer value for the entry may be increased to the next value in set W (e.g., from zero to $W_1$, from $W_1$ to $W_2$, from $W_2$ to $W_3$, or from $W_3$ to $W_4$) if call failure is encountered. Thus, a timer value of zero indicates that the most recent origination attempt was successful, a timer value of $W_1$ indicates one failed origination attempt since the last successful origination attempt, a timer value of $W_2$ indicates two failed origination attempts since the last successful origination attempt, a timer value of $W_3$ indicates three failed origination attempts since the last successful origination attempt, and a timer value of $W_4$ indicates at least four failed origination attempts since the last successful origination attempt.

In an embodiment, table 400 also stores the time of the last origination attempt for each entry. This last attempt time may be used to implement a timer for the entry, e.g., the timer is deemed to be expired if the current time minus the last attempt time is equal to or greater than the current timer value. The last attempt time may also be used to purge old entries in the table. For example, if the table is limited in size, then an entry for a new combination of data call type, network zone, and wireless network may overwrite the entry with the oldest last attempt time in the table.

FIG. 4 shows a specific embodiment of a call history table. In general, the table may have any format and may contain any type of information that is pertinent for controlling data call origination. Other designs for the table may also be implemented, and this is within the scope of the invention.

Figure 5:
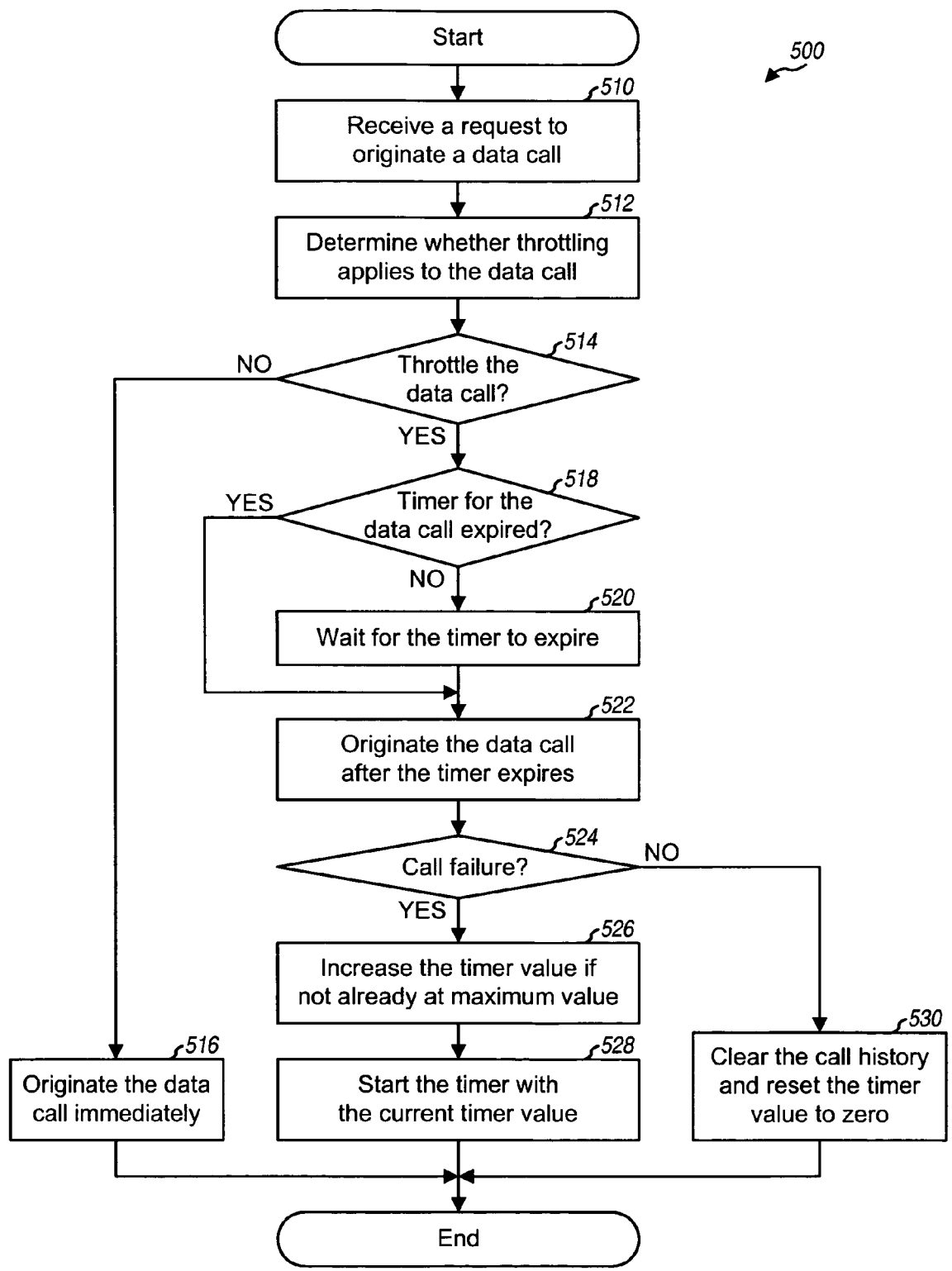
FIG. 5 shows a process for performing data call origination with throttling.

FIG. 5 shows a process 500 for performing data call origination with throttling. The wireless device receives a request (e.g., from the user or a higher layer application) to originate a data call (block 510). The wireless device then determines whether throttling applies to the data call (block 512). This may be achieved by (1) identifying an entry in the call history table applicable to the data call (e.g., for the same wireless network, network zone, and data call type) and (2) determining whether throttle enable is set to 'Yes' for that entry. The wireless device may apply throttling to some types of data calls and no throttling to other types of data calls. If throttling is not to be applied to the data call, as determined in block 514, then the wireless device originates the data call immediately (block 516).

If throttling is to be applied to the data call, then the wireless device determines whether the timer applicable to the data call has expired (block 518). If the most recent origination attempt was successful, then the timer will not be running and considered as expired. If the most recent origination attempt was unsuccessful, then the timer will have been started by this unsuccessful origination attempt and may or may not have expired. If the timer has not expired, then the wireless device waits for the timer to expire (block 520). After the timer expires, the wireless device originates the data call (block 522).

A determination is then made whether call failure is encountered for the data call (block 524). If the answer is 'Yes', then the wireless device increases the timer value from $W_x$ to $W_{x+1}$, unless $W_x$ is already the maximum value in set W (block 526). The wireless device then starts the timer with the current timer value (block 528). Otherwise, if the data call is successful and the answer is 'No' for block 524, then the wireless device clears the call history and resets the timer value to zero (block 530).

Figure 6:
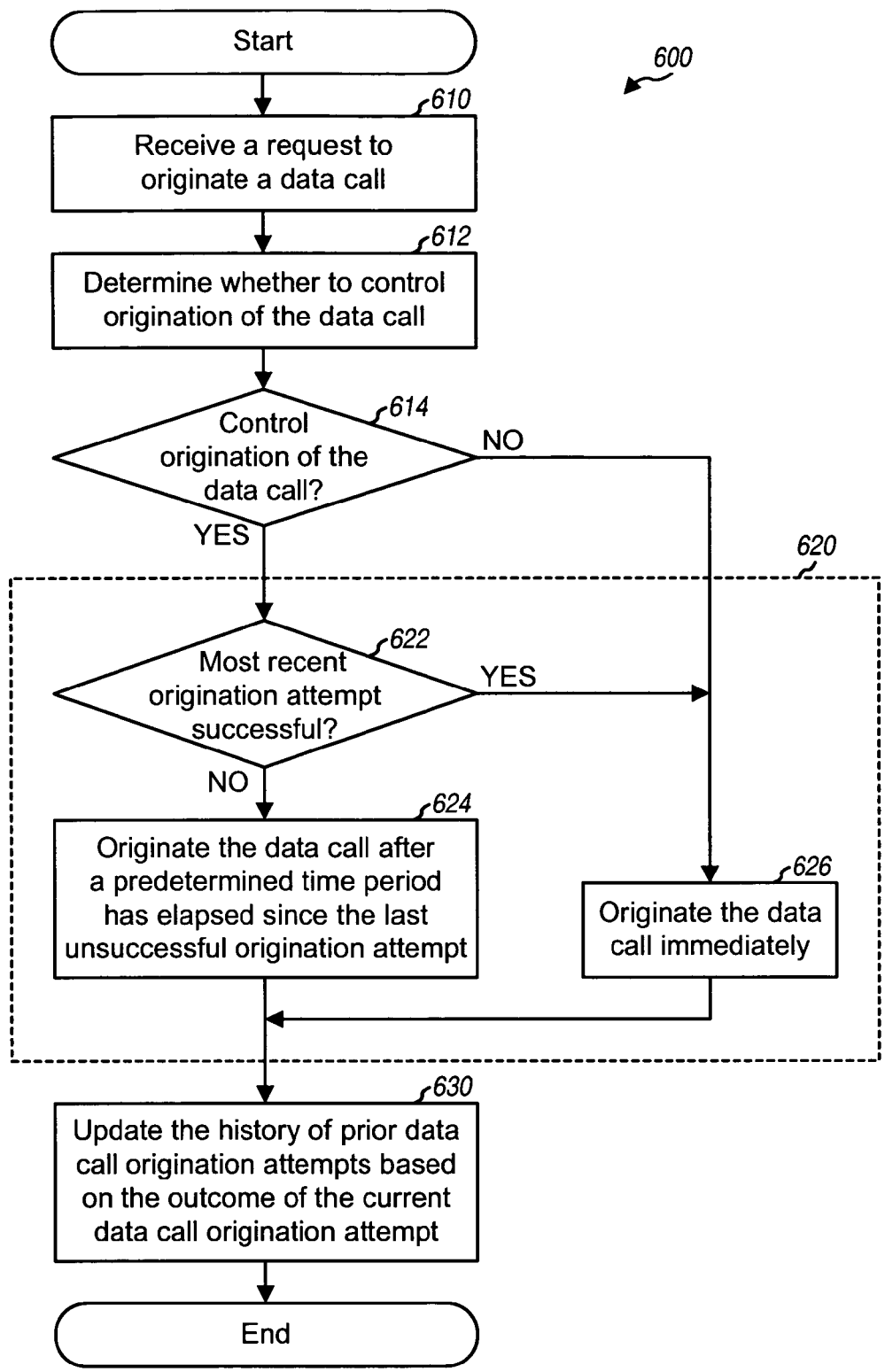
FIG. 6 shows a process for controlling data call origination based on a history of prior data call origination attempts.

FIG. 6 shows a process 600 for controlling data call origination based on a history of prior data call origination attempts. Initially, a request to originate a data call is received, e.g., from the user or a higher layer application (block 610). A determination is then made whether to control the origination of the data call (block 612). This may be achieved by (1) identifying a table entry that covers the data call and (2) determining whether origination control is to be applied to data calls covered by that entry. If origination control is not to be applied to the data call, as determined in block 614, then the wireless device originates the data call immediately (block 626).

If origination control is to be applied to the data call, then the origination of the data call is controlled based on prior data call origination attempts that are applicable to the data call (block 620). These prior origination attempts may be stored in the table entry that covers the data call. For block 620, a determination is first made whether the most recent origination attempt for the data call was successful (block 622). If the answer is 'Yes', then the wireless device originates the data call immediately (block 626). Otherwise, if the most recent origination attempt was unsuccessful, then the wireless device originates the data call after a predetermined time period has elapsed since the last unsuccessful origination attempt (block 624). This predetermined time period may be a fixed duration or a variable duration. The variable duration may be dependent on various factors such as the number of unsuccessful origination attempts since the last successful origination attempt (e.g., a longer duration for more failed origination attempts), the data call type, the call failure type, and so on. Alternatively, in place of block 624, the data call may be rejected if the predetermined time period has not elapsed.

After originating the data call, the history of prior data call origination attempts is updated based on the outcome for the current origination attempt (block 630). If the current origination attempt is successful, then this origination attempt becomes the last successful origination attempt. Conversely, if the current origination attempt is unsuccessful, then the number of unsuccessful origination attempts is incremented.

Processes 500 and 600 are for two embodiments of the techniques described herein. These techniques may also be implemented in other manners, and this is within the scope of the invention.

In certain circumstances, the wireless device may originate a data call immediately after a failed data call, even if throttling is enabled. For example, MIP-to-SIP fallback may be allowed, which means that the wireless device can originate a Simple IP data call if a Mobile IP data call fails. The wireless device may originate the Simple IP data call immediately after the Mobile IP call failure, without applying throttling to the Simple IP data call. If the Simple IP data call also fails, then the wireless device may apply throttling to subsequent data call originations. Alternatively, the wireless device may apply throttling to the Simple IP data call due to the Mobile IP call failure.

The wireless device may be multi-mode/hybrid and may be able to communicate with both the cdma2000 and 1xEV-DO networks. The wireless device may originate a data call on the 1xEV-DO network and may encounter call failure. The wireless device may then originate a data call on the cdma2000 network with or without throttling. The cdma2000 and 1xEV-DO networks may be considered as independent networks, so that call failure on one network does not provide any information on the likelihood of call success on the other network. In this case, the wireless device can originate a data call on the cdma2000 network immediately after encountering call failure on the 1xEV-DO network. Alternatively, the cdma2000 and 1xEV-DO networks may be considered as correlated, so that call failure on one network indicates greater likelihood of call failure on the other network. This correlation may be due to both networks having similar loading profile, sharing some network entities, and so on. In this case, the wireless device may originate a data call on the cdma2000 network after waiting a normal or reduced back-off period due to call failure on the 1xEV-DO network.

Figure 7:
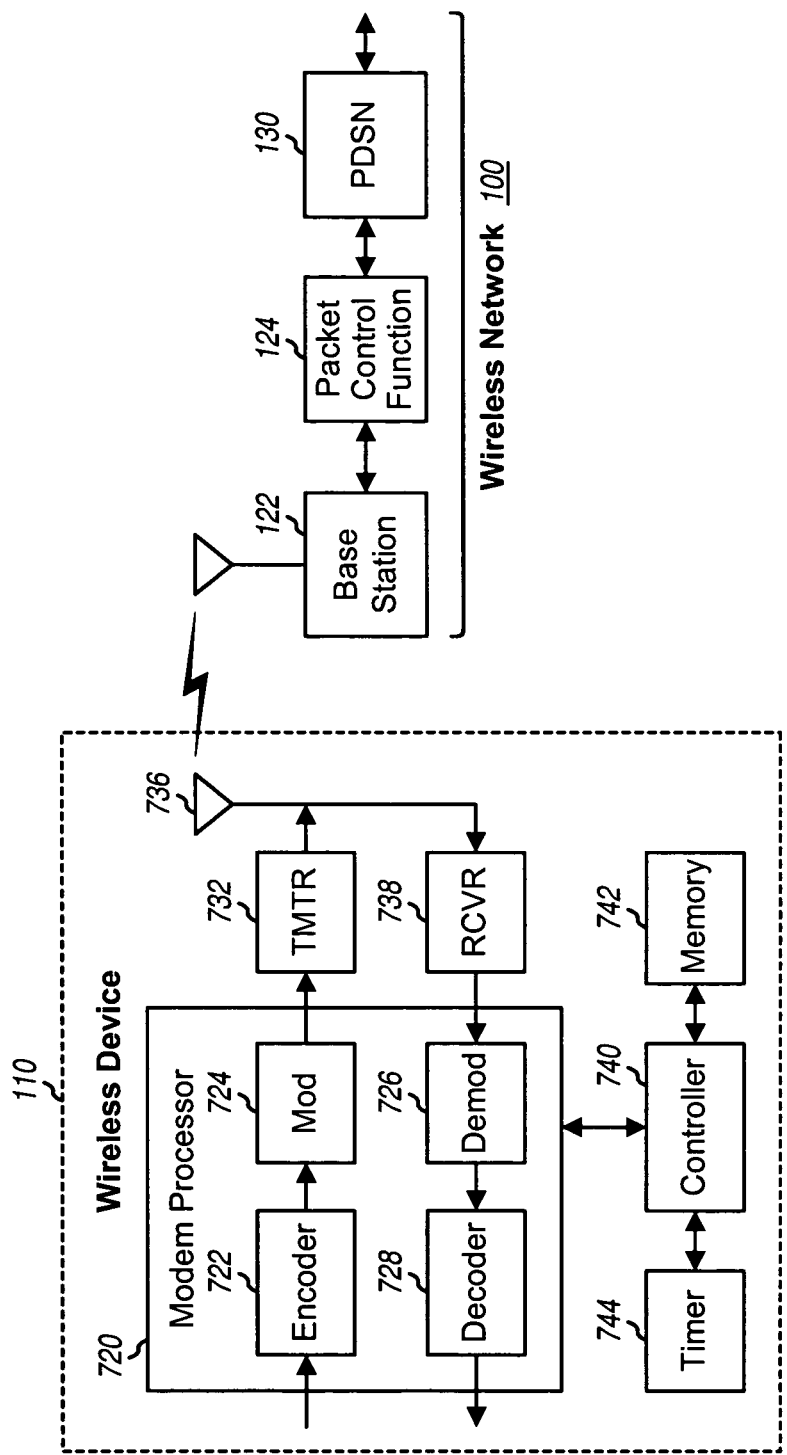
FIG. 7 shows a block diagram of the wireless device.

FIG. 7 shows an embodiment of wireless device 110, which includes a wireless modem for communication with wireless network 100, a controller 740, a memory 742, and a timer 744. On the transmit path, data and signaling to be sent by wireless device 110 are processed (e.g., formatted, encoded, and interleaved) by an encoder 722 and further processed (e.g., modulated, spread, channelized, and scrambled) by a modulator (Mod) 724 to generate a stream of data chips. A transmitter unit (TMTR) 732 then conditions (e.g., converts to analog, filters, amplifies, and frequency upconverts) the data chip stream to generate a reverse link signal, which is transmitted via an antenna 736. On the receive path, forward link signals transmitted by base stations in wireless network 100 are received by antenna 736 and provided to a receiver unit (RCVR) 738. Receiver unit 738 conditions (e.g., filters, amplifies, frequency downconverts, and digitizes) the received signal to generate data samples. A demodulator (Demod) 726 processes (e.g., descrambles, despreads, channelizes, and demodulates) the samples to obtain symbol estimates. A decoder 728 further processes (e.g., deinterleaves and decodes) the symbol estimates to obtain decoded data. Encoder 722, modulator 724, demodulator 726, and decoder 728 may be implemented by a modem processor 720. These units perform processing in accordance with the wireless technology (e.g., cdma2000 or 1xEV-DO) used by wireless network 100.

Controller 740 directs the operation of various units within wireless device 110. Controller 740 may implement process 500 in FIG. 5 and/or process 600 in FIG. 6 to control origination of data calls. Memory unit 742 stores program codes and data used by controller 740 and other units. Timer 744 provides timing information used to implement the back-off timers for call throttling.

Figure 8:
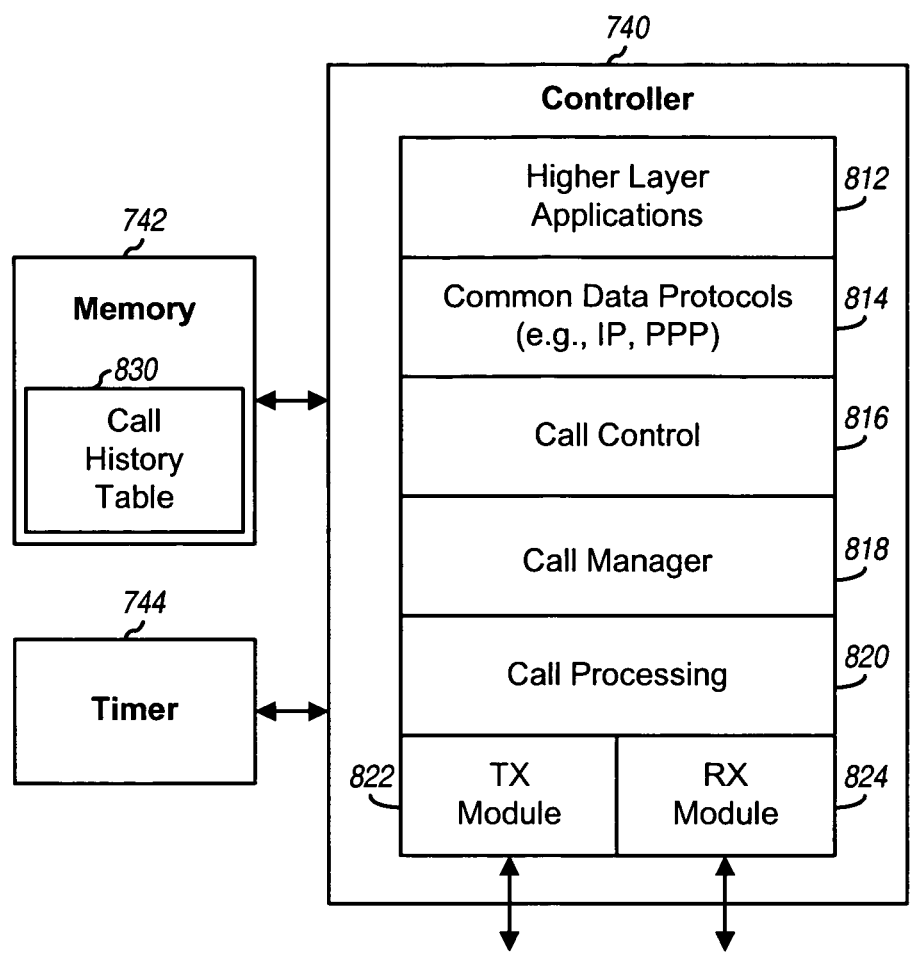
FIG. 8 shows a controller within the wireless device.

FIG. 8 shows an embodiment of controller 740 within wireless device 110. Within controller 740, higher layer applications 812 include various end-user applications such as, e.g., data applications that provide data services, a user browser, an email client, and so on. The data applications can generate requests to originate data calls. A common data protocols module 814 supports various protocols such as, e.g., IP, PPP, Transmission Control Protocol (TCP), User Datagram Protocol (UDP), and so on. A call control module 816 controls establishment and tear down of data calls, requests origination of data calls, and keeps track of the wireless networks and network zones for the wireless device. A call manager 818 manages calls, controls origination of data and other types of calls, and keeps track of the states of these calls. A call processing module 820 performs processing for signaling exchanged with the radio network. A transmit (TX) module 822 controls the operation of the transmit portion of the wireless modem. A receive (RX) module 824 controls the operation of the receive portion of the wireless modem. Higher layer applications 812 communicate with common data protocols module 814, which further communicates with call control module 816, which further communicates with call manager 818, which further communicates with call processing module 820, which further communicates with TX module 822 and RX module 824. Memory unit 742 may store a call history table 830 used to control origination of data calls. Call history table 830 may have the same format as table 400 in FIG. 4 or may be implemented in other manners.

Call manager 818 may perform various functions to control the origination of data calls. For example, call manager 818 may provide application programming interfaces (APIs) to allow other entities to enable and disable the throttling of data calls and to reset the back-off timers. Call manager 818 receives from call control module 816 indications of success or failure for data calls and the type of failure for each failed data call. Call manager 818 or some other entity can maintain call history table 830.

The techniques described herein may be used for various types of data calls such as, e.g., sockets and tethered data calls, Simple IP and Mobile IP data calls, and so on. A tethered data call is a data call made by a terminal equipment (e.g., a laptop computer) that is coupled to the wireless device and using the wireless device to obtain data service. In general, these techniques may be used for any type of data call in which the wireless device has knowledge of call failures and possibly the causes of these call failures.

The techniques described herein may be implemented by various means. For example, these techniques may be implemented in hardware, software, or a combination thereof. For a hardware implementation, the processing units used to control origination of data calls (e.g., controller 740 or call manager 818) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 742 in FIG. 7) and executed by a processor (e.g., controller 740). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile apparatus comprising:
a memory unit operative to store a history of prior data call origination attempts; and
a controller operative to:
receive a request to originate a data call with a wireless communication network;
control a barring of an origination of the data call based on the history of prior data call origination attempts including a prior data call origination attempt that was unsuccessful;
determine a time period that varies based on a number of failed origination attempts since a last successful origination attempt; and
bar origination of the data call for the time period after the most recent origination attempt, if the most recent origination attempt was unsuccessful.

2. The apparatus of claim 1, wherein the controller is operative to determine whether to control the barring of the origination of the data call based on a call type for the data call, a network zone for the data call, the wireless communication network for the data call, or a combination thereof.

3. The apparatus of claim 1, wherein the controller is operative to determine whether a most recent origination attempt for a prior data call was successful or unsuccessful.

4. The apparatus of claim 3, wherein the predetermined time period is within a range of values and is progressively longer for more failed origination attempts.

5. The apparatus of claim 3, wherein the predetermined time period is within a range of values and is exponentially longer for more failed origination attempts.

6. The apparatus of claim 3, wherein the controller is operative to originate the data call immediately if the most recent origination attempt was successful and to originate the data call after the predetermined time period has elapsed if the most recent origination attempt was unsuccessful.

7. The apparatus of claim 6, wherein the controller is operative to update the history of prior data call origination attempts based on an outcome for the data call.

8. The apparatus of claim 3, wherein the controller is operative to originate the data call immediately if the most recent origination attempt was successful or if the most recent origination attempt was unsuccessful and the predetermined time period has elapsed and to reject the request to originate the data call if the most recent origination attempt was unsuccessful and the predetermined time period has not elapsed.

9. The apparatus of claim 1, wherein the controller is operative to start a timer with a current timer value if a most recent origination attempt for a prior data call was unsuccessful and to originate the data call after the timer expires.

10. The apparatus of claim 9, wherein the controller is operative to reset the current timer value to a minimum value if the data call is successful and, if the data call is unsuccessful, to increase the current timer value if less than a maximum value and to start the timer with the current timer value.

11. The apparatus of claim 1, wherein the history of prior data call origination attempts indicates the number of failed origination attempts since a last successful origination attempt.

12. The apparatus of claim 1, wherein the memory unit is operative to store the history of prior data call origination attempts for different wireless communication networks, different network zones, different types of data calls, or a combination thereof.

13. The apparatus of claim 1, wherein the memory unit is operative to store a table containing the history of prior data call origination attempts, and wherein each entry in the table is for a different combination of wireless communication network, network zone, and data call type.

14. The apparatus of claim 13, wherein the memory unit is operative to store, for each entry in the table, the number of failed origination attempts since a last successful origination attempt, an indication for whether to control origination of data calls covered by the entry, time of last origination attempt, or a combination thereof.

15. The apparatus of claim 13, wherein the memory unit is operative to store a call failure type for each entry in the table with a failed origination attempt, wherein each call failure type is associated with a set of timer values, and wherein each timer value is indicative of an amount of time to wait after a failed origination attempt before attempting another data call origination.

16. The apparatus of claim 1, wherein the memory unit is configured to store in a table an entry corresponding to a data call origination attempt if the data call origination attempt failed due to unavailability of the wireless communication network or an authentication failure with the wireless communication network.

17. A method, at a mobile apparatus, of originating data calls, comprising:
receiving a request to originate a data call with a wireless communication network;
controlling a barring of an origination of the data call based on a history of prior data call origination attempts including a prior data call origination attempt that was unsuccessful, wherein the controlling of the barring of the origination of the data call comprises:
determining a time period that varies based on a number of failed origination attempts since a last successful origination attempt; and
barring origination of the data call for the time period after the most recent origination attempt, if the most recent origination attempt was unsuccessful.

18. The method of claim 17, wherein the controlling of the barring of the origination of the data call comprises:
determining whether a most recent origination attempt for the a prior data call was successful or unsuccessful.

19. The method of claim 18, wherein the controlling of the barring of the origination of the data call further comprises:
originating the data call immediately if the most recent origination attempt was successful; and
originating the data call after the predetermined time period has elapsed if the most recent origination attempt was unsuccessful.

20. The method of claim 19, further comprising:
updating the history of prior data call origination attempts based on an outcome for the data call.

21. The method of claim 18, wherein the controlling of the barring of the origination of the data call further comprises:
originating the data call immediately if the most recent origination attempt was successful or if the most recent origination attempt was unsuccessful and the predetermined time period has elapsed; and
rejecting the request to originate the data call if the most recent origination attempt was unsuccessful and the predetermined time period has not elapsed.

22. The method of claim 17, further comprising:
maintaining the history of prior data call origination attempts for different wireless communication networks, different network zones, different types of data calls, or a combination thereof.

23. The method of claim 17, further comprising storing in a table an entry corresponding to a data call origination attempt if the data call origination attempt failed due to unavailability of the wireless communication network or an authentication failure with the wireless communication network.

24. A mobile apparatus, comprising:
means for receiving a request to originate a data call with a wireless communication network;
means for controlling a barring of an origination of the data call based on a history of prior data call origination attempts including a prior data call origination attempt that was unsuccessful, wherein the means for controlling of the barring of the origination of the data call comprises:
means for determining a time period that varies based on a number of failed origination attempts since a last successful origination attempt; and
means for barring origination of the data call for the time period after the most recent origination attempt, if the most recent origination attempt was unsuccessful.

25. The apparatus of claim 24, wherein the means for controlling of the barring of the origination of the data call comprises:
means for determining whether a most recent origination attempt for a prior data call was successful or unsuccessful.

26. The apparatus of claim 25, wherein the means for controlling of the barring of the origination of the data call further comprises:
means for originating the data call immediately if the most recent origination attempt was successful; and
means for originating the data call after the predetermined time period has elapsed, if the most recent origination attempt was unsuccessful.

27. The apparatus of claim 26, further comprising:
means for updating the history of prior data call origination attempts based on an outcome for the data call.

28. The apparatus of claim 25, wherein the means for controlling of the barring of the origination of the data call further comprises:
means for originating the data call immediately if the most recent origination attempt was successful or if the most recent origination attempt was unsuccessful and the predetermined time period has elapsed; and
means for rejecting the request to originate the data call if the most recent origination attempt was unsuccessful and the predetermined time period has not elapsed.

29. The apparatus of claim 24, further comprising:
means for maintaining the history of prior data call origination attempts for different wireless communication networks, different network zones, different types of data calls, or a combination thereof.

30. A non-transitory computer-readable medium comprising:
a computer program product, comprising:
a first set of codes for causing a computer to receive a request to originate a data call with a wireless communication network;
a second set of codes for causing the computer to control a barring of an origination of the data call based on a history of prior data call origination attempts including a prior data call origination attempt that was unsuccessful;
a third set of codes for determining a time period that varies based on a number of failed origination attempts since a last successful origination attempt; and
a fourth set of codes for barring origination of the data call for the time period after the most recent origination attempt, if the most recent origination attempt was unsuccessful.

31. The computer program product of claim 30, wherein the computer-readable medium further comprises:
a fifth set of codes for causing the computer to determine whether a most recent origination attempt for the a prior data call was successful or unsuccessful.

32. The computer program product of claim 31, wherein the computer-readable medium further comprises:
a sixth set of codes for causing the computer to originate the data call immediately if the most recent origination attempt was successful; and
a seventh set of codes for causing the computer to originate the data call after the predetermined time period has elapsed if the most recent origination attempt was unsuccessful.

33. The computer program product of claim 31, wherein the computer-readable medium further comprises:
a sixth set of codes for causing the computer to originate the data call immediately if the most recent origination attempt was successful or if the most recent origination attempt was unsuccessful and the predetermined time period has elapsed; and
a seventh set of codes for causing the computer to reject the request to originate the data call if the most recent origination attempt was unsuccessful and the predetermined time period has not elapsed.

34. The computer program product of claim 30, wherein the computer-readable medium further comprises:
a fifth set of codes for causing the computer to maintain the history of prior data call origination attempts for different wireless communication networks, different network zones, different types of data calls, or a combination thereof.

35. At least one processor, comprising:
a first electronic unit to receive a request to originate a data call with a wireless communication network;
a second electronic hardware unit to control a barring of an origination of the data call based on a history of prior data call origination attempts including a prior data call origination attempt that was unsuccessful;
a third electronic hardware unit to determine a time period that varies based on a number of failed origination attempts since a last successful origination attempt; and
a fourth electronic hardware unit to bar origination of the data call for the time period after the most recent origination attempt, if the most recent origination attempt was unsuccessful.

36. The at least one processor of claim 35, further comprising:
a fifth electronic unit to determine whether a most recent origination attempt for a prior data call was successful or unsuccessful.

37. The at least one processor of claim 36, further comprising:
a sixth electronic unit to originate the data call immediately if the most recent origination attempt was successful; and
a seventh electronic unit to originate the data call after the predetermined time period has elapsed if the most recent origination attempt was unsuccessful.

38. The at least one processor of claim 36, further comprising:
a sixth electronic unit to originate the data call immediately if the most recent origination attempt was successful or if the most recent origination attempt was unsuccessful and the predetermined time period has elapsed; and
a seventh electronic unit to reject the request to originate the data call if the most recent origination attempt was unsuccessful and the predetermined time period has not elapsed.

39. The at least one processor of claim 35, further comprising:
a fifth electronic unit to maintain the history of prior data call origination attempts for different wireless communication networks, different network zones, different types of data calls, or a combination thereof.

* * * * *